May 17, 1966  A. NAWIJN  3,251,286

AERIAL CAMERA

Filed May 8, 1963

INVENTOR
ARJEN NAWIJN

BY
Dean, Fairbank & Hirsch
ATTORNEYS

United States Patent Office 3,251,286
Patented May 17, 1966

3,251,286
AERIAL CAMERA
Arjen Nawijn, Delft, Netherlands, assignor to N.V. Optische Industrie "De Oude Delft," Delft, Netherlands
Filed May 8, 1963, Ser. No. 278,931
Claims priority, application Netherlands, Mar. 13, 1963, 290,168
2 Claims. (Cl. 95—61)

The invention relates to aerial cameras and, more particularly, to such cameras having a shutter consisting of one or more opaque discs which are provided with exposure apertures and are arranged for continuous rotation about an axis parallel to the optical axis of the camera.

This type of shutter is well known in the art in various forms, both as focal-plane shutter and as between-the-lens shutter. It offers the possibility to achieve short exposures in combination with high exposure repetition frequencies, if desired. By using a set of two or more such discs and driving them at different speeds having a predetermined ratio to each other, the exposure repetition frequency can be made considerably lower than would correspond to the number of revolutions per time unit of either disc.

An unexpected disadvantage of this type of shutter in application to aerial cameras resides in the fact that especially rotational movements of the aeroplane about its longitudinal axis, the roll of the plane, may create strong mechanical forces in the shutter discs tending to push the disc edges out of the plane in which the discs rotate. Generally, the position of the camera in the aeroplane will be such that the axis of rotation of the shutter discs subtends a considerable angle to the longitudinal axis of the aeroplane. Accordingly, rolling of the plane will cause a change in the position in space of this axis of rotation resulting in so-called coriolis forces which, in view of the usually high rotational speeds of the discs, may be rather strong.

Deviations of the rotating discs from their plane shape create the risk that the discs touch each other or adjacent parts of the camera whereby serious damage may be caused. This could be avoided by a camera design which leaves large free distances between the shutter discs inter se and to adjacent parts of the camera, but this is not always possible or desirable.

It is the principal object of the present invention to provide a shutter construction whereby the deformation of the shutter discs due to coriolis forces is effectively reduced.

In accordance with the invention this object is achieved if the thickness of the disc or discs is made to decrease from the center towards the periphery.

The invention will be further described with reference to the accompanying drawings in which.

Figure 1:
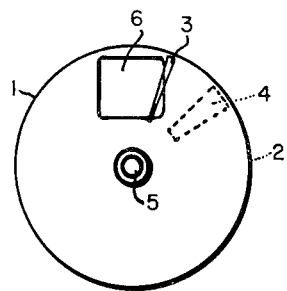
FIG. 1 is a view of a typical two-disc focal plane shutter seen from the side of the focal plane.
Figure 2:
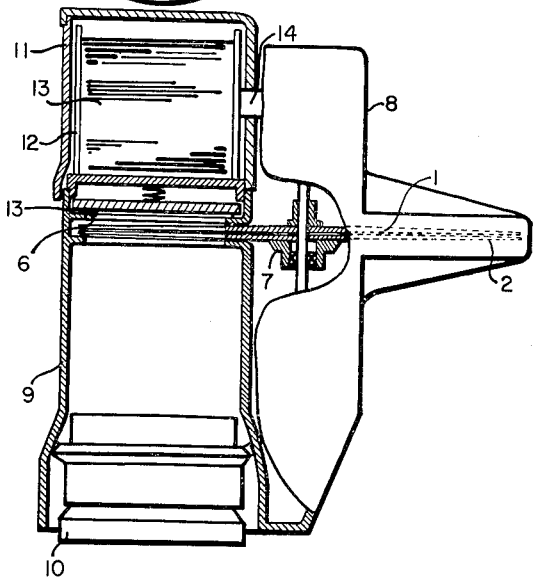
FIG. 2 is a diagrammatic view, partly sectional, of an aerial camera provided with a focal plane shutter according to the invention as shown in FIG. 1.
Figure 3:
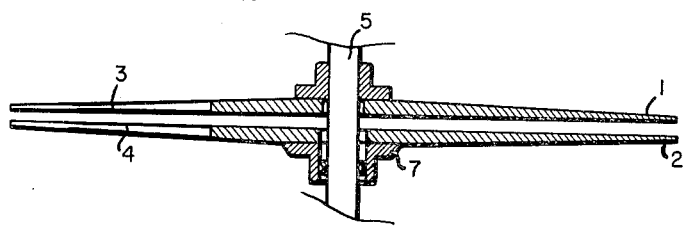
FIG. 3 is an enlarged sectional view of the shutter used in the camera of FIG. 2.

The focal plane shutter of FIG. 1 consists of two opaque discs 1 and 2 mounted for rotation about a common axis and each having at least one radial exposure slit 3 and 4, respectively. The discs are driven at differential speeds such that periodically one slit of one disc passes along the film gate 6 concurrently with one slit of the other disc, at which time an exposure occurs. In order to establish the differential rotation of the discs, disc 1 is fixedly mounted on shaft 5 while disc 2 is rotatable about the shaft 5 by means of a bearing 7 (FIGS. 2 and 3). Disc 2 is coupled to shaft 5 by gear wheels (not shown) to secure the required fixed ratio between the disc speeds.

The driving mechanism is housed in the part of the camera housing indicated by 8. Connected to this part are a lens cone 9 with objective lens 10 and a film cassette 11 in which, in FIG. 2, only the receiving spool 12 with film 13 are shown. The spool 12 is driven through a shaft 14.

It can be seen, particualrly in FIG. 3, that in accordance with the present invention, the discs 1 and 2 have a thickness which gradually decreases from the center towards the edge. A conical profile has proved to be very suitable although other profiles can be used likewise. Since the shutter discs, due to their tapered profile, show markedly reduced deviations out of their plane due to coriolis forces, disc 1 with its exposure slit 3 can safely be positioned quite close to the film gate 6 so that the shutter efficiency is improved.

It will be clear that the present invention is not limited to cameras having a focal plane shutter. If a shutter having one or more continuously rotating discs is used as a between-the-lens shutter, such discs will traverse the space between two consecutive lenses of the objective and application of the present invention brings the advantages that a small axial distance between such lenses is sufficient for accommodating the shutter. Thus, more freedom is left to the lens designer.

In one suitable practical example the thickness of the discs at the edge is only one-quarter or less of that in the center. By means of a conical profile satisfying this condition it has been possible to reduce the maximum deviations of the discs to less than 25% of those occurring with a disc of uniform thickness, all other conditions being the same in both instances.

I claim:

1. An aerial camera having a film source, an inlet through which light passes to impinge on the film, a narrow recess in said camera defined between said light inlet and said film, said recess extending at substantially right angles to the path of light impinging on said film a shutter comprising at least two opaque discs each having an exposure aperture, and means mounting said discs for continuous rotation in said recess, about an axis parallel to the optical axis of the camera, said discs being positioned with the exposure apertures therein extending in planes parallel to each other and parallel to the plane of said recess for rotation of said discs in a plane substantially at right angles to the path of light impinging on such film, said discs being of relatively small thickness and being positioned closely adjacent to each other and opposed surfaces of said recess, each of said discs having a conical profile in cross section whereby its thickness decreases from the center thereof toward the periphery thereof.

2. The combination set forth in claim 1 in which the thickness of each of the discs at its periphery is no greater than one-quarter of the thickness of the disc at its center.

References Cited by the Examiner
UNITED STATES PATENTS
2,474,323  6/1949  Rattray _____ 95—12.5
2,506,909  5/1950  Vinten _____ 352—219

OTHER REFERENCES
German allowed application 1,119,117, December 7, 1961.

JOHN M. HORAN, Primary Examiner.
NORTON ANSHER, Examiner.